BEST AVAILABLE COPY
J. Steger.
Car-Starter.
No. 2830 Reissued Jan. 14, 1868.
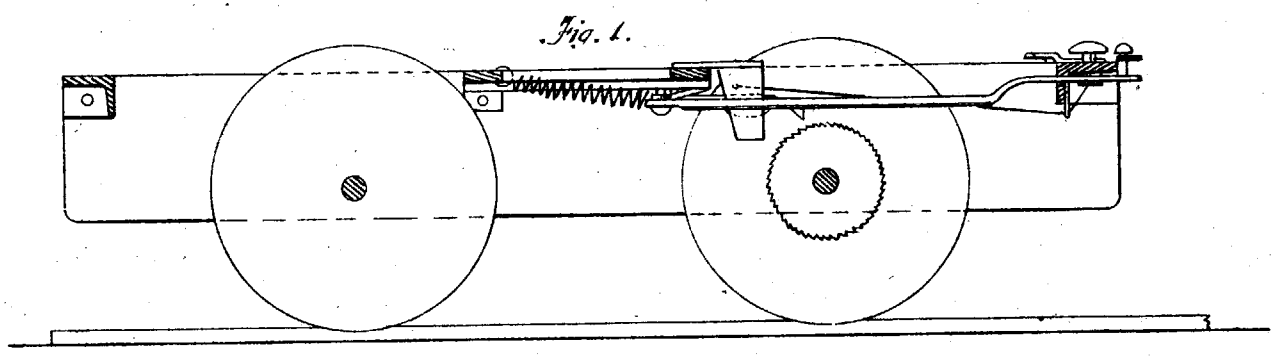
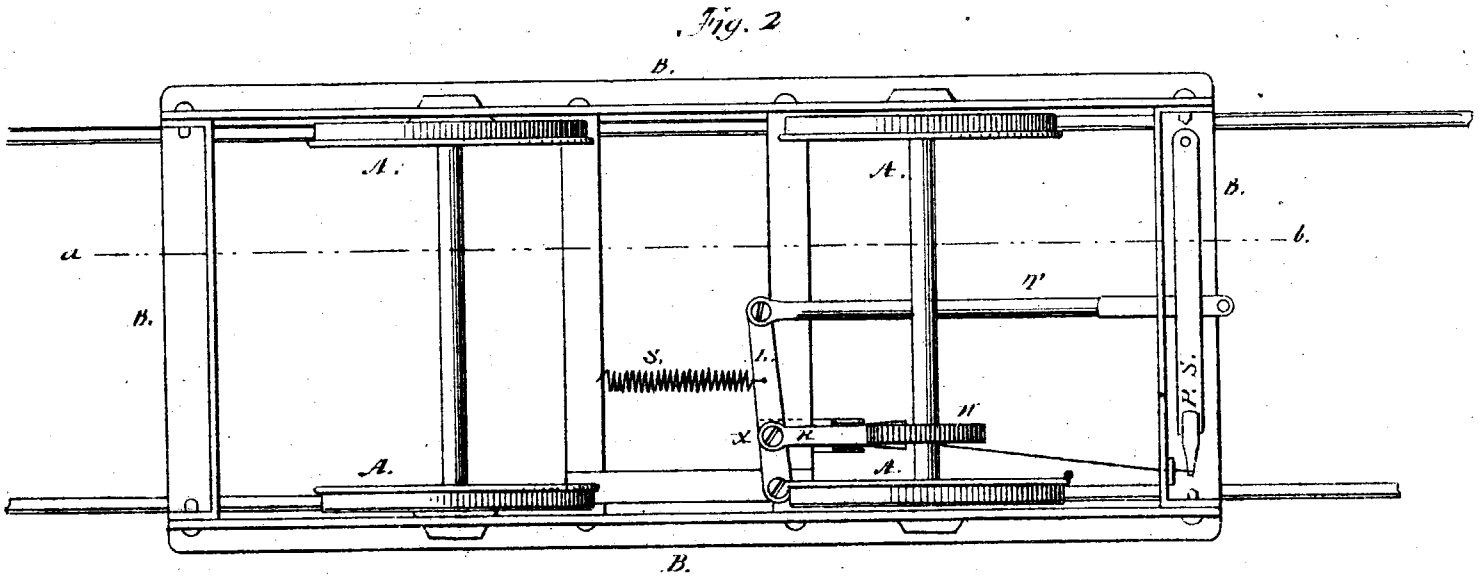
Witnesses:
Benj. Tatham Jr.
C. L. Birch
Inventor
Joseph Steger

United States Patent Office.

JOSEPH STEGER, OF NEW YORK, N. Y.

*Letters Patent No.* 66,648, *dated July* 9, 1867; *reissue No.* 2,830, *dated January* 14, 1868.

IMPROVED CAR-STARTING APPARATUS.

The Schedule referred to in these Letters Patent and making part of the same.

TO ALL WHOM IT MAY CONCERN:

Be it known that I, JOSEPH STEGER, of New York, 82 Beekman street, in the county and State of New York, have invented an Improved Car-Starting Apparatus; and I do hereby declare the following to be a full, clear, and exact description thereof, which will enable those skilled in the art to make and use the same, reference being had to the accompanying drawing, forming part of this specification, in which drawing—

Figure 1 represents a longitudinal vertical section of this invention, the line *a b*, Figure 2, indicating the plane of section.

Figure 2 is an inverted plan of the same, showing the power-multiplying gear applied to one end of the car only. A similar gear should be attached to each end.

Similar letters indicate corresponding parts.

The object of my invention is to increase the traction-force until the car acquires a certain initial velocity, and to this end I use a power-multiplying-gear, consisting of a lever or pulley and ratchet-wheel, or other equivalent device, in combination with the wheels or other parts of the car, which rest upon the track or roadway.

A A represent the wheels of the car, as attached to the ordinary axles. B is the frame of the car. To this frame is attached the lever L, which has its fulcrum on a pin, *r*, secured to said frame, and the loose end of which connects with the traction-bar T by a pivot, *u*. From said lever extends the pawl or click R, which is connected to the lever by a pivot, *x*, at a distance from the fulcrum *r* equal to about one-third of the distance between said fulcrum and the pivot *u*, which forms the connection between the lever and traction-bar. Said click or pawl is subjected to the action of a spring, P S, in the platform of the car, and it is so arranged that it can be thrown in or out of gear with the ratchet-wheel W, at the option of the driver. This ratchet-wheel is mounted on the axle. A spiral spring, S, is so arranged as to press or draw back the traction-bar, lever, and pawl, when the traction-force is diminished below the power required to start the car.

When the car is to be stopped or to be started, the driver presses down the platform-spring, and allows the pawl to engage with its wheel. In this position, it prevents the car from running backwards, and when the traction-force is applied, the pawl and ratchet-wheel move the car forward with a force increased or multiplied in proportion as the motion of the car is less than that of the traction-bar.

It is obvious that, in the multiplying-gear, the lever can be replaced by any other device capable of producing the same effect, such as one or more pulleys rigged up like a hoisting-tackle, or any other device capable of producing the desired effect. The pawl may either be suspended by a spring or other convenient arrangement, so that it may be thrown in or out of gear with the wheel, as described, or that it can be readily drawn back by the spiral spring S, or otherwise, when the traction-force is relaxed, and be in position to act upon the ratchet-wheel when the traction-force is applied. As the traction-bar is drawn forward and starts the car, the pawl will be stopped at a point clear of the revolving ratchet-wheel, and be there held by the traction-force, or other suitable arrangement, until the car is stopped, or the traction-force ceases to act, when it is drawn back to its original position, ready to act on the ratchet-wheel.

I do not confine myself to the mechanical arrangement herein described, as it may be varied by any practical mechanic, without departing from the substantial originality of my invention, which consists in so arranging the multiplying-gear that it may, at the pleasure of the driver or by its own motion, be thrown in gear with the axle or wheels of the car, and that, by its action, when so thrown in gear with the axle or wheels of the car, it will increase or multiply the traction-force in proportion as said traction-force moves faster than the car, until said car acquires a certain initial velocity, whereupon the multiplying-gear will become disconnected from the revolving parts, and all loss by friction between the multiplying-gear and said revolving parts may be avoided.

What I claim as my invention, and desire to secure by Letters Patent, is—

1. The multiplying-gear, consisting of the traction-bar T, lever or equivalent L, pivoted pawl R, ratchet-wheel W, spiral spring S and spring P S, constructed and operating substantially as and for the purpose specified.

2. The gearing-device, consisting of the spring P S, provided with a foot-button and the pawl R, suspended from said spring, substantially as and for the purpose set forth.

JOSEPH STEGER.

Witnesses:

W. HAUFF,

GUSTAV BERG.